United States Patent [19]

Mueller

[11] Patent Number: 5,057,560

[45] Date of Patent: Oct. 15, 1991

[54] THERMOTROPIC COPOLYMER HYDROGELS FROM N,N-DIMETHYLACRYLAMIDE AND METHOXY-ETHYL (METH) ACRYLATE

[75] Inventor: Karl F. Mueller, New York, N.Y.

[73] Assignee: Ciba-Geigy Corporation, Ardsley, N.Y.

[21] Appl. No.: 526,191

[22] Filed: May 21, 1990

Related U.S. Application Data

[63] Continuation-in-part of Ser. No. 343,979, Apr. 26, 1989, abandoned, which is a continuation-in-part of Ser. No. 200,212, May 31, 1988, abandoned, which is a continuation-in-part of Ser. No. 105,070, Oct. 5, 1987, abandoned.

[51] Int. Cl.$^5$ .................... C08L 89/00; C08F 218/02
[52] U.S. Cl. ........................ 524/22; 524/58; 524/521; 524/555; 526/307.5; 526/307.7
[58] Field of Search ................ 526/307.7, 307.5; 524/22, 58, 521, 555

[56] References Cited

U.S. PATENT DOCUMENTS

| | | | |
|---|---|---|---|
| 4,388,436 | 6/1983 | Chen | 526/307.7 |
| 4,548,990 | 10/1985 | Mueller et al. | 526/332 |
| 4,625,009 | 11/1986 | Izumitani et al. | 526/307.6 |

*Primary Examiner*—Joseph L. Schofer
*Assistant Examiner*—N. Sarofim
*Attorney, Agent, or Firm*—Luther A. R. Hall

[57] ABSTRACT

Novel thermotropic hydrogel forming polymers are described, which are ramdom copolymers of N,N-dimethyacrylamide with methoxy-ethyl acrylate or methacrylate. The linear polymers exhibit in water a lower-critical-solution-temperature (LCST) between 0° and 70° C. The water swelling of the crosslinked polymers is extremely temperature dependent and the gels show sharply defined clear to opaque transitions. The novel polymers are useful in drug delivery systems, absorption and extraction processes and as qualitative thermometers, thermosensors and self-activating sunscreens, for example for greenhouses.

13 Claims, No Drawings

THERMOTROPIC COPOLYMER HYDROGELS FROM N,N-DIMETHYLACRYLAMIDE AND METHOXY-ETHYL (METH) ACRYLATE

This is a continuation-in part application of application Ser. No 343,979, filed on April 26, 1989, now abandoned, which is a continuation-in-part application of application Ser. No. 200,212, filed on May 31, 1988, now abandoned, which is in turn a continuation-in-part application of application Ser. No. 105,070, filed on Oct. 5, 1987, now abandoned.

BACKGROUND OF THE INVENTION

Many polymer solutions exhibit a cloud point phenomenon, which occurs at the cloud point temperature, above or below which the polymer is soluble and the solution is clear, but below or above which it becomes insoluble and precipitates and solutions become opaque. In most polymer-solvent systems solubility decreases with falling temperature, but in some cases involving polar polymers, the opposite occurs and the polymer suddenly precipitates at a specific, higher temperature, the cloud-point temperature, or lower critical solution temperature (LCST). If such clear to opaque transitions due to deswelling occur at a low enough temperature and are reversible, such polymer solutions or gels are useful in a variety of applications such as self-activating sunscreens or temperature dependent drug release systems. Polymer solutions exhibiting such reversible phase transitions occurring at low temperatures have been described in Japanese patent Nos. 85-190444; 85-208336; and 86-66707; they consist of aqueous solutions or gels of poly-isopropylacrylamide and of isopropyl acrylamide/N-methylolacrylamide copolymers and of pyrrolidyl or piperidyl/acrylamide copolymers. Besides these acrylamides, N-iso-, N-n-, N-cyclopropylacrylamide and the corresponding methacrylamides are described in these patents, as well as N,N-diethylacrylamide as the only, disubstituted acrylamide. Only these acrylamides or methacrylamides have a sufficiently hydrophobic component as part of their structure to form homopolymers, which can change from a hydrophilic water binding to a hydrophobic water excluding structure at relatively low temperatures.

In copending patent application, Ser. No. 343,979 hydrogels and linear polymers with strong clear—opaque temperature dependent transitions and low LCST in water are described, which consist of copolymers of N,N-dimethylacrylamide with alkyl- and alkoxy-alkyl acrylates in which the alkyl or alkoxy group contains at least an average of 1.2 carbon atoms in the alkyl or alkoxy moiety. It has now been discovered that copolymers of N,N-dimethyl-acrylamide (DMA), which is very hydrophilic, but whose homopolymer by itself does not form a thermo-reversible aqueous solution, and methoxyethyl acrylate or methacrylate (one carbon atom in the alkoxy group) can also be used to make copolymers which as aqueous solutions or gels exhibit LCSTs and temperature dependent reversible cloud points and swelling changes at low temperatures.

DETAILED DESCRIPTION

The polymers of this invention are random copolymers which comprise the copolymerization product of
(a) 10 to 60% by weight of N,N-dimethylacrylamide;
(b) 90 to 40% by weight of 2-methoxyethyl acrylate or methacrylate,
(c) 0 to 5% by weight of a polyolefinic crosslinking monomer, and
(d) 0 to 30% by weight of one or more monoolefinic monomers other than the acrylates of component (b).

Preferred polymers are those where there is 0% by weight of component (d).

Preferred monomer (b) is 2-methoxy-ethyl acrylate.

Also preferred copolymers of the instant invention are the copolymers which comprise the copolymerization product of
(a) 20 to 50% by Weight of N,N-dimethylacrylamide,
(b) 80 to 50% by weight of 2-methoxy-ethyl acrylate or methacrylate,
(c) 0 to 1% by weight of a polyolefinic crosslinking monomer, and
(d) 0 to 25% by weight.

Still more preferred copolymers are those which are the copolymerization products of
(a) 20 to 50% by weight of N,N-dimethacrylamide,
(b) 80 to 50% by weight of 2-methoxy-ethyl acrylate and wherein
(c) is zero.

Still other preferred copolymers of this instant invention are those wherein both, component (c) and component (d), are each zero.

Other preferred copolymers of this invention are those which are the copolymerization products of
(a) 10–40% by weight N,N-dimethylacrylamide,
(b) 60–35% by weight of 2-methoxy-ethyl acrylate,
(c) 0–5% by weight of a polyolefinic crosslinking monomer, and
(d) 5–25% by weight of one or more monoolefinic monomers.

Also preferred are compositions prepared in the presence of 1–10 mol %, based on the total olefinic monomers polymerized, of a chain transfer agent.

2-Methoxy-ethyl acrylate and 2-methoxy-ethyl methacrylate can be used alone or in combination with each other. When comonomers (d) are present, they may be used in minor amounts, e.g. up to 30 weight percent, and may be copolymerizable monomers, such as alkyl acrylates, alkyl methacrylates, alkanoic acid - vinyl esters, alkyl vinyl ethers, as well as alkyl fumarates and maleates, where the alkyl group contains 1–18 C-atoms; styrene; a-methylstyrene; silicone containing (meth-)acrylates, like tris(-trimethylsiloxanyl-)silyl-propyl methacrylate; fluorine containing (meth-)acrylates, like hexafluoro-isopropyl methacrylate or 1,1,2,2 -tetrahydroheptadecylfluoro-decyl (meth-)acrylate; hydroxyethyland hydroxypropyl acrylate and methacrylate; (poly-ethoxy)ethyl methacrylate; alkoxy-alkyl acrylates and methacrylates with 2 to 20 carbon atoms in the alkoxy-alkyl group, like 2-ethoxy- or ethoxy-ethoxy ethyl methacrylate and butoxyethyl acrylate and methacrylate; N-vinylpyrrolidone; acrylamide and N-isopropyl-, N-n-propyl-, N,N-diethyl-, N-2 and 3-hydroxypropyl- and N-2-hydroxy-ethyl acrylamide-, N-cyclohexyl-, N-methyl-N-ethyl-acrylamide and methacrylamide; vinyl acetamide; 2-dimethylaminoethyl methacrylate and -methacrylamide; 2-isocyanatoethyl methacrylate or m-isopropenyl-a,a-dimethylbenzyl isocyanate can also be incorporated to introduce reactive sites for subsequent crosslinking reactions.

Where such other copolymerizable monomers are present, they may be present in amounts up to 30, preferably up to 25% by weight.

If crosslinked polymers are desired, commonly used crosslinking polyolefinic monomers are added in amounts varying from about 0.005 to about 1% by weight. Typical examples of polyolefinic monomers are: allyl acrylate and methacrylate, ethylene glycol-, diethylene glycol-, triethylene glycol-, tetraethylene glycol-, and generally polyethylene oxide glycol diacrylates and dimethacrylates; 1,4-butane diol and poly-n-butylene oxide glycol diacrylates and dimethacrylates; propylene glycol and poly- propylene oxide glycol diacrylates and dimethacrylates; thiodiethylene glycol diacrylate and dimethacrylate; neopentyl glycol diacrylate and dimethacrylate; trimethylolpropane tri and tetraacrylate; pentaerythritol tri and tetraacrylate; divinylbenzene; divinyl ether; divinyl sulfone; disiloxanyl-bis-3-hydroxybutyl diacrylate or methacrylate and related compounds.

Bisphenol-A diacrylate or dimethacrylate, ethoxylated bisphenol-A diacrylate or dimethacrylate; methylene bisacrylamide or methacrylamide, dimethylene bisacrylamide or methacrylamide; allyl and diallyl maleate, triallyl melamine, diallyl itaconate, diallyl phthalate, triallyl phosphite, polyallyl sucrose, sucrose diacrylate, glucose dimethacrylate; also unsaturated polyesters, such as poly-(alkylene glycol maleates) and poly-(alkylene-glycol fumarates), like poly(propylene glycol maleate) and poly(polyalkyleneoxide glycol maleate).

Macromeric divinyl urethane compounds can also be used for copolymerization, like poly-(ethylene oxide) dimethacrylate, poly-(tetramethylene oxide dimethacrylate (U.S. Pat. No. 4,192,827) or polysiloxane-dialkylene- dimethacrylates, (U.S. Pat. No. 4,605,712).

To the extent that the polymer of this invention contain components other than N,N-dimethyl-acrylamide and 2-methoxy-ethyl acrylate or methacrylate, the cloud point effect may be weakened.

Where the polymer according to the present invention is substantially uncrosslinked and soluble in water below the cloud point, solutions containing such polymer exhibit the reversible clear to opaque transition and reversible precipitation. Preferably such solutions contain between about 50% to as little as about 0.2% by weight polymer. The preferred uncrosslinked polymers of this embodiment are those employing methoxy-ethyl acrylate.

The hydrated, crosslinked polymers exhibit a reversible clear to opaque cloud point transition at a temperature between about 0° C. up to about 60° C., depending upon the polymer chosen. The polymers exhibit clarity at temperatures below the transition point.

Accordingly, the hydrated copolymers are useful as qualitative thermometers, thermosensors, self-activated sunscreens and the like. For example, the copolymer in its hydrated state, either as an aqueous gel or solution, can be placed between transparent plates, such as glass or plastic to form a self-activating sunscreen or thermoregulator. This sandwich structure has to be sealed to prevent loss of water from the hydrated polymer contained within the transparent plates. As the plate temperature rises to exceed the transition temperature, the hydrated polymer opacifies, thereby blocking a portion of sunlight normally passing through the plates. As a result, such sandwich plates can be used in greenhouses to modulate the amount of sunlight and sunlight generated heat within a greenhouse, or to moderate the amount of sunlight generated heat within a structure, such as a house or office, containing the aforementioned sandwich plates, for example as windows, skylights and the like. Depending upon the environment, the thickness of the gel or solution within such plates can vary widely, but is preferably between about 0.01 and 50 mm.

At their cloud point the polymers become insoluble in water or, if in a crosslinked state, shrink from a high to a low water content gel. This shrinkage is especially pronounced when the crosslinked polymers are synthesized as 10–50% solutions in good solvents. Such heat sensitive reversibly swelling gels and or reversibly precipitating and dissolving polymers are useful as active-ingredients absorbing and releasing gels, as extracting polymers and as heat activated membranes, changing from a high-permeability hydrophilic state to a low permeability hydrophobic state over a narrow temperature range.

The cloud-point phenomenon and the accompanying precipitation or shrinkage of the polymer is not restricted to exclusively aqueous solutions or gels; amounts of an organic solvent up to their solubility limit in the system can be present, especially aprotic solvents such as ketones, esters, ethers or lactones, for example methyl ethyl ketone, isopropyl acetate, dimethylsulfoxide or N-methylpyrrolidone, to name a few. Addition of methyl ethyl ketone, for example, allows one to raise the cloud point temperature. Aqueous solutions and gels of the novel polymers containing up to 30% of solvents with at least 1% solubility in water, are therefore another embodiment of the instant invention.

In the presence of hydrophobic n-alkyl, n-alkoxy-alkyl, oligo-siloxanyl-alkyl or perfluoroalkyl-alkyl acrylate moieties, the polymers are often extremely tacky in the dry as well as in the water swollen, or hydrated, state and can therefore be used as adhesives, both in their hydrogel and in their hydroplastic state. This property can be exploited, for example, in bio-adhesives, for instance in adhesive patches for the mouth.

SYNTHESIS

The polymerization is suitably carried out with a free radical generating initiator at a temperature in the range from about 30° C. to about 150° C., the preferred temperature ranges being between about 45° C. and about 80° C. These initiators are preferably peroxides or azo catalysts having a half-life at the polymerization temperature of at least 20 minutes. Typical useful peroxy compounds include: isopropyl percarbonate, tert-butyl peroctoate, benzoyl peroxide, lauryl peroxide, decanoyl peroxide, acetyl peroxide, succinic acid peroxide, methyl ethyl ketone peroxide, tert.-butyl peroxyacetate, propionyl peroxide, 2,4-dichlorobenzoyl peroxide, tert.-butyl peroxypivalate, pelargonyl peroxide, 2,5-dimethyl-2,5-bis(2-ethyl-hexanoylperoxy) hexane, p-chlorobenzoyl peroxide, tert.-butyl peroxybutyrate, tert.-butyl peroxymaleic acid, tert.-butyl peroxyisopropyl carbonate, bis-(1-hydroxy-cyclohexyl) peroxide; azo compounds include: 2,2-azo-bis-isobutyronitrile: 2,2'-azobis(2,4-dimethylvaleronitrile); 1,1'-azo-bis-(cyclohexane carbonitrile), 2,2'-azo-bis-(2,4-dimethyl-4-methoxyvaleronitrile).

Other free radical generating mechanisms: can be employed, such as x-rays, electron-beams and UV-radiation. Preparation of crosslinked films and sheets by UV radiation in the presence of a photo-initiator such as diethoxyacetophenone, 1-hydroxycyclohexyl phenyl ketone, 2,2-dimethoxy-2-phenylacetophenone, phenothiazine, diisopropylxanthogen disulfide, benzoin, benzoin methyl ether and other benzoin derivatives is a preferred method.

The amount of initiator can vary from 0.002% to 1% by weight of the monomer, but is preferably from 0.03 to 0.3% by weight thereof.

Also useful are linear polymers synthesized in the presence of 1–10 mol %, based on the total amount of monomers polymerized, of a chain transfer agent in order to reduce the molecular weight and thereby obtain a polymer which is more easily handled in the water-equilibrated state than is a high MW-polymer. Any chain-transfer agent commonly used to modify the MW of free-radical polymerized vinyl polymers can be used, for example branched or linear alkyl thiols with 2–21 carbon atoms; mercapto acids like thioacetic-, thiopropionic-, thioglycolic-, thiomalic acid; thio-alcohols like thioethanol or thioglycerol; as well as fluorinated thiols like perfluoroalkyl-alkylene-thiols, where perfluoroalkyl is a group with 2–10 C atoms, also halogenated solvents such as chloroform, carbon tetrachloride, 1,1,1-trichloroethane and trichloroethylene.

The novel polymers can be synthesized in bulk or in solution using conventional techniques. Crosslinked and uncrosslinked polymer sheets or films for example can easily be synthesized by filling the monomer mixture, which contains heat- or UV-activated free radical initiators, into a mold held together by clamps and preferably lined with a mold releasing polymer, followed by exposing the assembly to heat or UV radiation or both for several hours. The monomers may be dissolved in solvents and such solvents may be present in amounts up to 90%. Conventional solution polymerization can be carried out in any suitable solvent, which may be ketones, esters, ethers, alcohols, amides etc., such as acetone, methyl ethyl ketone, isopropyl acetate, N,N-dimethylformamide, N-methylpyrrolidone, dioxane, ether, ethanol, isopropanol and butanol. The resulting polymers can be cast on substrates and dried to form films which can be subsequently equilibrated in water.

The polymers can also be prepared in form of round beads by suspension polymerization in an aqueous brine solution, as for instance described in U.S. Pat. No. 4,224,427. Such beads are especially useful in extraction processes or for the controlled delivery of drugs; the novel polymers in the form of beads of 40–1000 microns are thus another embodiment of this invention.

When the novel polymers are synthesized as crosslinked hydrogels in bulk or suspension, their water content at equilibrium varies slightly with the equilibration temperature, being higher at lower temperatures. The cloud point is therefore a function also of the equilibration temperature, being an approximately constant temperature differential higher. With the same polymer therefore, cloud points can vary over a several degree range, dependent on equilibration temperature. Compositions with thermoreversible cloud points, that is clear to opaque transitions, between 0° C. and 60° C. consist of 0.2 to 50% by weight of the crosslinked polymers of this invention and 50 to 99.8% by weight of water.

The aqueous solutions of the novel polymers, which are not crosslinked, can also subsequently be transformed into gels by incorporating them into known gel forming media, for example into a polyacrylamide gel recipe as used for electrophoresis, agar-agar gels, polyvinylalcohol and poly-ethyleneoxide gels, proteinaceous gels or cellulosic gels, like hydroxy-ethyl cellulose. Such aqueous gels containing dissolved or dispersed therein 0.2 to 50% by weight uncrosslinked polymers and which have thermo-reversible cloud points between 0° and 60° C. are another embodiment of this invention.

The following examples serve to illustrate the present invention.

The temperature dependency of water swelling was determined gravimetrically by equilibration of the polymers in water at various temperature for at least 24 hours; LCSTs were determined visually on 1% aqueous solutions, which were filled into 3 mm wide test tubes and immersed into a water bath, whose temperature was raised by ° C. per minute.

In the following examples the water content is defined as:

$$DSw\,(\%) = \frac{\text{weight of wet sample} - \text{weight of dry sample}}{\text{weight of wet sample}} \times 100;$$

and swelling ratio as $$SR = \frac{\text{weight of swollen sample}}{\text{weight of dry sample}}.$$

EXAMPLE 1

2.5 g N.N-Dimethylacrylamide (DMA), 7.5 g 2-methoxy-ethyl acrylate (MOEA) and 0.01 g ethylene glycol dimethacrylate (EDMA) are mixed together with 0.01 g benzoin methyl ether (BME). The mixture is degassed 3 times in vacuo and kept under a dry $N_2$-blanket. A 4x4 inch glass mold, lined with MYLAR and held together by clamps is assembled, using 0.5 mm silicone cord as spacer. The mold is then filled with the monomer mixture and exposed to UV light from a SYLVANIA BLACKLITE BLUE lamp for 7 hours from a 2 inch distance. Subsequently the mold is dissassembled and the clear, flexible polymer sheet is immersed in deionized water and allowed to swell to equilibrium.

Sample discs are cut from the swollen polymer sheet, equilibrated at various temperatures, and their water contents and swelling ratios determined gravimetrically.

EXAMPLES 2–8

Following the procedure of example 1, polymers with the compositions listed in the following tables are synthesized.

| Example Nr. | Composition, % by weight | | | | | |
|---|---|---|---|---|---|---|
| | DMA | MOEA | EOEA | BOEA | (EO)$_2$EA | EDMA |
| 2 | 20 | 79.9 | — | — | — | 0.1 |
| 1 | 25 | 74.9 | — | — | — | 0.1 |
| 3 | 30 | 69.9 | — | — | — | 0.1 |
| 4 | 50 | 49.9 | — | — | — | 0.1 |
| 5 | 25 | — | 74.9 | — | — | 0.1 |
| 6 | 50 | — | 49.9 | — | — | 0.1 |
| 7 | 50 | — | — | 49.9 | — | 0.1 |
| 8 | 50 | — | — | — | 49.9 | 0.1 |

In these examples
MOEA is methoxy-ethyl acrylate,
EOEA is ethoxy-ethyl acrylate,
(EO)$_2$EA is ethoxy-ethoxy-ethyl acrylate, and
BOEA is butoxy-ethyl acrylate After equilibration in water at temperatures between 10° and 25° C., all gels are clear, but become white opaque when the temperature is increased by a few degrees.

The Swelling Ratios, S.R., at various temperatures are determined and are listed in the following table; a strong dependency of swelling on temperature is observed:

| Example Nr. | Swelling ratio, S.R. at temperatures, °C.: | | | | | | |
|---|---|---|---|---|---|---|---|
| | 4 | 12 | 25 | 30 | 40 | 50 | 60 |
| 2 | 10.1 | 9.7 | 3.6 | 2.9 | 1.9 | 1.5 | 1.4 |
| 1 | 11.7 | 11.0 | 5.6 | 4.7 | 2.6 | 1.9 | 1.6 |
| 3 | 14.3 | 14.1 | 8.3 | 7.3 | 4.2 | 2.4 | 1.9 |
| 4 | 16.2 | 14.9 | 13.1 | 12.3 | 10.4 | 8.0 | 5.8 |
| 5 | 7.9 | 3.9 | 1.5 | 1.4 | 1.3 | 1.2 | 1.2 |
| 6 | 13.9 | 13.6 | 9.0 | 8.0 | 5.3 | 3.1 | 2.3 |
| 7 | 2.9 | 2.3 | 1.8 | 1.7 | 1.5 | 1.4 | 1.3 |
| 8 | 7.8 | 7.3 | 6.6 | 6.3 | 5.3 | 4.1 | 3.2 |

EXAMPLE 9

Synthesis of a thermotropic hydrogel from methoxyethyl methacrylate.

Using the procedure of example 1, a crosslinked copolymer sheet is synthesized consisting of 25% by weight N,N-dimethylacrylamide, 74.8% by weight 2-methoxy-ethyl methacrylate and 0.2% ethyleneglycol dimethacrylate. An aqueous gel with a very slight bluish haze is obtained, which has the following swelling ratios S.R. at the given temperatures: 11.5 at 9° C., 5.3 at 15° C., 4.5 at 23° C., 3.5 at 30° C., and 2.1 at 50° C.

The following examples describe the synthesis of linear polymers.

EXAMPLE 10

2 g N,N-dimethylacrylamide, 8 g methoxy-ethyl acrylate and 10 g absolute ethanol are weighed into a 50 ml bottle containing a magnetic stirring bar; 0.01 g N,N-bis isobutyronitrile (VAZO 64) are added and dissolved; the mixture is degassed in vacuo, sparged with dry nitrogen, closed with a screw-cap and stirred in thermostated ethyleneglycol bath at 55° C. for 18 hours. Another 0.01 g VAZO-52 are added and the polymerization is continued for another 3 hours at 65° C. The viscous polymer solution is allowed to cool to room temperature and has a solids content of 49.6%, corresponding to >99% conversion.

A dried sample of the polymer is used to make a 1% solution in water and the cloud-point, or LCST of the solution is determined as 30° C., and listed in the following table.

EXAMPLES 11-15

Following the procedure of example 10, the polymer compositions listed in the following table were synthesized and their LCST determined, (above which the polymers are insoluble).

| Example Nr. | Composition, % by weight | | | | | % Water at LCST | LCST, °C. |
|---|---|---|---|---|---|---|---|
| | DMA | MOEA | EOEA | BOEA | (EO)₂EA | | |
| 10 | 20 | 80 | — | — | — | 40 | 30 |
| 11 | 25 | 75 | — | — | — | 52 | 36 |
| 12 | 30 | 70 | — | — | — | 65 | 45 |
| 13 | 50 | — | 50 | — | — | 78 | 46 |
| 14 | 50 | — | — | 50 | — | 51 | <0 |
| 15 | 50 | — | — | — | 50 | 68 | 62 |

EXAMPLES 16 and 17

Following the procedure of example 1, crosslinked copolymers of DMA, MOEA and $C_6F_{13}$-ethyl acrylate were synthesized; their compositions, water contents and cloudpoints are listed in the following table:

| Example | Composition, % by weight | | | | $DS^w$, % at 15° C. | C.P. °C. |
|---|---|---|---|---|---|---|
| | DMA | MOEA | $C_6$FA | EDMA | | |
| 16 | 25 | 65.3 | 9.3 | 0.4 | 64 | 23 |
| 17 | 25 | 56.0 | 18.6 | 0.4 | 55 | 24 |

The following example shows the synthesis of a gel with a thermoreversible cloud point from a soluble dimethylacrylamide copolymer.

EXAMPLE 18

To 10 g of a 2% solution of ultrapure agarose in hot water are added 10 of a 1% aqueous solution of the polymer of example 10; the milky white mixture is poured into a glass tube with a 2 mm inner diameter and rapidly cooled to room temperature, forming a clear gel with a reversible cloud point of 35° C.

EXAMPLE 19

12.5 g $MgCl_2 \times 6$ $H_2O$ and 360 ml of a 20 % NaCl solution in water are filled into a 3-neck flask equipped with a heating mantle, thermowatch, condenser, nitrogen inlet and a constant speed stirring motor. The brine is heated to 75° C. and the stirring speed is set at 500 rpm; the flask is sparged with nitrogen and 123 ml 1-normal NaOH are added dropwise. A mixture of 50 g N.N-dimethylacrylamide and 150 g 2-methoxy-ethyl acrylate, containing 0.3 g t-butylperoctoate are added while stirring under nitrogen at 250 rpm, the mixture is stirred at 75° C. for 2 hours and for another hour at 85° C. 12 ml conc.HCl are added, the stirrer is stopped and the supernatant liquid is decanted from the beads, which are rinsed free of NaCl in distilled water. Round beads of 0.1–0.5 mm diameter are obtained, which exhibit a strong clear to opaque transition and thermo-reversible swelling with a Swelling Ratio of 14.5 at 10° C. and of 4 at 30° C.

What is claimed is:

1. A random copolymer which comprises the copolymerization product of
   (a) 10 to 60% by weight of N,N-dimethylacrylamide;
   (b) 90 to 40% by weight of 2-methoxy-ethyl acrylate or methacrylate, and
   (d) 0 to 30% by weight of one or more other monoolefinic monomers.

2. A copolymer according to claim 1 wherein component (d) is 0% by weight.

3. A copolymer according to claim 1 wherein component (b) is 2-methoxy-ethyl acrylate.

4. A copolymer according to claim 1 which comprises the copolymerization product of
   (a) 20 to 50% by weight of N,N-dimethylacrylamide,
   (b) 80 to 50% by weight of 2-methoxy-ethyl acrylate or methacrylate, and
   (d) 0 to 25% by weight of one or more other monoolefinic comonomers.

5. A copolymer according to claim 3, in which component (d) is zero.

6. A copolymer according to claim 5 which comprises the copolymerization product of
   (a) 20 to 50% by weight of N,N-dimethylacrylamide and
   (b) 80 to 50% by weight of 2-methoxy-ethyl acrylate.

7. A copolymer according to claim 3 which comprises the copolymerization product of
   (a) 10 to 40% by weight of N,N-dimethylacrylamide;
   (b) 60 to 35% by weight of 2-methoxy-ethyl acrylate, and
   (d) 5 to 25% by weight of one or more other monoolefinic monomers.

8. A copolymer according to claim 1 which is prepared in the presence of 1 to 10 mol %, based on the total olefinic monomers polymerized, of a chain transfer agent.

9. A composition exhibiting a reversible temperature dependent clear to opaque transition between 0° C. and 60° C., which comprises
   (a) 50 to 99.8% by weight of water, and
   (b) 0.2 to 50% by weight of a linear copolymer according to claim 1.

10. A composition according to claim 9 in which component (a) is in form of an aqueous gel.

11. A composition according to claim 10 in which the aqueous gel is an an agarose, gelatin or poly-(acrylamide) gel.

12. A composition according to claim 9 in which the aqueous phase contains up to 30% by weight of an organic solvent with at least 1% solubility in water.

13. A composition according to claim 1 in form of sperical beads with 40–1000 micron dry diameter.

* * * * *